Patented Apr. 18, 1933

1,904,573

UNITED STATES PATENT OFFICE

WILLIAM F. TULEY, OF NUTLEY, NEW JERSEY, ASSIGNOR TO THE NAUGATUCK CHEMICAL COMPANY, OF NAUGATUCK, CONNECTICUT, A CORPORATION OF CONNECTICUT

VULCANIZATION OF RUBBER

No Drawing. Application filed December 19, 1930, Serial No. 503,521. Renewed June 8, 1932.

This invention relates to the art of treating rubber or rubber compounds or similar vulcanizable materials and particularly to the provision of an improved procedure for the vulcanization of the same in the presence of an organic accelerator, and of compounds or compositions with which to effect the purpose of the invention.

In the vulcanization of rubber or rubber compounds with the aid of organic accelerators it is desirable to use those accelerators which may be mixed with the rubber or rubber compound without inducing appreciable vulcanizing effect at atmospheric temperature or at slightly elevated temperatures, such as those encountered during milling, calendering, extruding, etc. operations, but which actively accelerate vulcanization at the customary vulcanizing temperatures. Other accelerators such as those commonly known as "ultra" accelerators or "semi-ultra" accelerators sometimes initiate the vulcanizing reaction prematurely either in the cold or during the mixing etc. operations, resulting in "scorching" or "setting-up" which hinders or entirely prohibits the further use of the rubber or rubber compound. Consequently these compounds require extra precautions in handling to avoid "scorching" etc. It is also known to treat rubber containing certain accelerators with ammonia or amines in order to activate the accelerators or to form more powerful accelerator combinations in the rubber after mixing and before vulcanization, the rubber having been formed into the desired final shape previous to the ammonia treatment.

By the present invention a superior way of utilizing the properties of ammonia or amines has been found which comprises introducing into a rubber compound at the time of mixing an accelerator, particularly an "ultra" or "semi-ultra" accelerator, and a material which is substantially thermally stable at milling temperatures but which has the ability to decompose at higher desired temperatures to yield ammonia or aliphatic amines which form with the ultra or semi-ultra accelerator a more powerful accelerator combination. The materials are further characterized in that they are substantially neutral and do not substantially activate ultra or semi-ultra accelerators at ordinary or milling temperatures.

By the present invention it has also been found that substantial reduction in cost and economy of operation will result when the customary amounts of organic accelerators, particularly the "ultra" or "semi-ultra" accelerators, are substantially reduced and used in conjunction with certain materials to form accelerator compositions. These materials that are used in conjunction with the organic accelerators are substantially neutral acid amides. When such materials are so used they are characterized in that they do not substantially promote the vulcanizing reaction at mixing and milling temperatures. All the materials are characterized in that they have the ability per se to decompose to form or yield aliphatic amines or ammonia at vulcanizing temperatures substantially above milling temperatures, which amines or ammonia in turn are believed to actively promote per se the vulcanizing reaction, or promote the vulcanizing reaction by partially or completely neutralizing the acidic substances present in the rubber.

The materials referred to as being employed in conjunction with the organic accelerators—and more especially the "ultra" accelerator or "semi-ultra" accelerators,— among which are the thiazoles such as mercaptobenzothiazole and its esters such as 2,4-dinitrophenyl benzothiazyl sulphide and its sulphides such as benzothiazyl monosulphide and benzothiazyl disulphide, sulphides such as tetramethyl thiuram disulphide, tetramethyl thiuram monosulphide etc. and their derivatives, esters of N-substituted dithiocarbamic acids such as 2,4-dinitrophenyl dimethyl dithiocarbamate, also the accelerating aldehyde amine condensation products such as heptaldehyde-aniline, butyraldehyde aniline, etc.—are found to typically include carbamides such as urea and certain substituted ureas which may be represented by the structural formula:

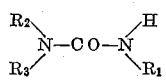

wherein $R_1$ represents hydrogen or an aliphatic hydrocarbon radical, and $R_2$ and $R_3$ represent hydrogen or similar or dissimilar aliphatic or aromatic hydrocarbon radicals. It is preferred to use urea or the mono or di-substituted ureas such as mono-methyl urea, mono-ethyl urea, symmetrical or unsymmetrical dimethyl urea, symmetrical or unsymmetrical diethyl urea, methyl ethyl urea, mono-benzyl urea, mono phenyl urea, and symmetrical ethyl phenyl urea.

The following examples illustrate the invention, without limiting it thereto, the parts being percent by weight of the rubber:

*Example 1.*—Mercaptobenzothiazole and urea were incorporated, in the amounts shown in the following table, into a typical tire tread composition containing rubber, carbon black, zinc oxide, sulphur, and appropriate softeners. The tensile tests on the vulcanized samples, given below, may be compared with those obtained with a similar stock accelerated with mercaptobenzothiazole alone:

Tensile strength (lbs. per sq. in.)

| Cure | Mercapto-benzo-thiazole 1.25 | Mercapto-benzo-thiazole 0.25 urea 2.0 |
|---|---|---|
| 90' at 5# | 2662 | 2487 |
| 20' at 30# | 3890 | 3730 |
| 30' at 30# | 4190 | 4390 |
| 40' at 30# | 4340 | 4300 |
| 50' at 30# | 4470 | 4030 |

*Example 2.*—Comparative tests were made with the same tread compositions containing tetramethylthiuram monosulphide without and with the presence of urea, in the amounts indicated below:

Tetramethylthiuram monosulphide _____ 0.2  0.125
Urea _____ __   1.0

| Cure | Tensile strength | |
|---|---|---|
| 45' at 5# | No cure | No cure |
| 60' at 5# | 2277 | 2670 |
| 40' at 25# | 4000 | 4090 |

*Example 3.*—Similar comparative tests were made with similar tread compositions containing 2,4-dinitrophenyl dimethyl dithiocarbamate without and with the presence of urea:

Dithiocarbamate accelerator ____ 0.875  0.50
Urea _____ ____   1.75

| Cure | Tensile strength | |
|---|---|---|
| 30' at 25# | 2400 | 2020 |
| 60' at 25# | 4050 | 4070 |
| 30' at 30# | 3650 | 3580 |
| 60' at 30# | 3935 | 4080 |

*Example 4.*—Similar comparative tests were made with inner tube compounds prepared according to the following formulæ, parts being by weight:

| | A | B |
|---|---|---|
| Rubber | 100 | 100 |
| Zinc oxide | 10 | 10 |
| Blanc fixe | 30 | 30 |
| Stearic acid | 4 | 2 |
| Sulphur | 2 | 2 |
| Butyraldehyde-aniline condensation product | 1 | 0.5 |
| Urea | | 1.0 |

Samples of the above described rubber mixes were cured in a mold as indicated below, and the tensile strengths were determined, with the following results:

| Cure | Tensile strength (lbs. per sq. in.) | |
|---|---|---|
| | A | B |
| 60' at 5# | 744 | 639 |
| 75' at 5# | 1047 | 985 |
| 4' at 60# | 2720 | 3203 |
| 6' at 60# | 3043 | 3843 |
| 8' at 60# | 3270 | 3457 |

*Example 5.*—Two rubber compounds were prepared according to the following formulæ:

| | C | D |
|---|---|---|
| Rubber | 100 | 100 |
| Zinc oxide | 10 | 10 |
| Stearic acid | 3 | 3 |
| Sulphur | 3 | 3 |
| 2,4 dinitrophenyl benzothiazyl sulphide | 0.4 | 0.4 |
| Urea | | 0.4 |

Slabs of the above compounds were vulcanized in a mold as indicated below, and the tensile strengths were determined, with the following results:

| Cure | Tensile strength | |
|---|---|---|
| | C | D |
| 120' at 5# | 772 | 1089 |
| 45' at 35# | 2389 | 3607 |
| 60' at 35# | 2434 | 3833 |
| 75' at 35# | 2447 | 3503 |

Instead of the accelerators mentioned, other accelerators may be used such as 2-4 dinitrophenyl diethyl dithiocarbamate, 2-6 dinitro 4-chloro phenyl dimethyl dithiocarbamate, picryl dimethyl dithiocarbamate, phenyl methylene bis dimethyl dithiocarbamate, phenyl methylene bis diethyl dithiocarbamate; substituted mercaptobenzothiazoles containing substituents such as alkyl alkoxyl, amino, halogen, and nitro groups in the benzene nucleus; thiocarbanilide; reaction products of carbon disulphide with aldehyde-amine condensation products, such as the carbon disulphide derivative of butyraldehyde-aniline condensation product, and the reaction product of carbon disulphide with the condensation product of formaldehyde and piperidine.

The acid amide or any desired mixtures of acid amides may be added in any desired manner, as by incorporating directly or in a "master batch" with the rubber mix on the mill, or by first mixing intimately with the chosen organic accelerator, mechanically or by means of a mutual solvent, or by dissolving the acid amide in a suitable solvent and adding the solution to the rubber on the mill, or by dispersing the amide in a liquid medium such as by grinding it into a paste or dispersion with an oil; for example urea is preferably added to rubber in the form of an aqueous solution, or in the form of a paste with an oil such as paraffin oil.

If desired, the acid amide may be dissolved or dispersed in latex (natural or artificial) and the latex containing the amide then added to the rubber compound on the mill.

One of the important advantages of the present invention is the economy it affords in connection with the manufacture of rubber goods. Referring to Example 1 for instance it will be seen that substantially the same tensile strength is obtained with a stock compounded with 0.25 parts of mercaptobenzothiazole and 2.0 parts urea as with the same stock containing 1.25 parts of mercaptobenzothiazole and no urea. At the prevailing market price of mercaptobenzothiazole of around 63¢ per pound and urea around 9¢ per pound (which latter figure is expected to be reduced) it will thus be seen that the accelerating cost may be reduced from 79¢ to 34¢, a saving of 45¢ per pound which is well over 50%. The economic value of the invention is therefore considerable, and the contribution of this invention to the industry will be readily appreciated.

It is also clear that the process of this invention may be applied in the production of rubber articles from vulcanizable latex compositions.

The invention may be used variously, for instance in the production of rubber articles which are press cured or mold cured, such as tires, inner tubes, etc.

It is to be understood that the expression "aliphatic hydrocarbon radicals" is to be construed to include both open chain and alicyclic hydrocarbon radicals which may be either saturated or unsaturated, and also aralkyl radicals.

While a detailed description of the invention is given above, it is to be understood that various modifications will suggest themselves,—for instance various compounding ingredients including anti-agers etc. may be used in conjunction with the acceleration compositions,—as will be clear to those skilled in the art,—all without departing from the spirit of the invention—and the invention is not to be limited except as indicated in the appended claims.

Having thus described my invention, what I claim and desire to protect by Letters Patent is:

1. A process of producing vulcanized rubber which comprises mixing a rubber composition containing sulphur and a metallic oxide with an organic accelerator in the presence of a substantially neutral nitrogenous organic compound devoid of acid material which compound has the ability to decompose at vulcanizing temperatures to yield an aliphatic amine or ammonia, and vulcanizing the rubber.

2. A process of producing vulcanized rubber which comprises mixing a rubber composition containing sulphur and a metallic oxide with an organic "ultra" or "semi-ultra" accelerator in the presence of a substantially neutral nitrogenous organic compound devoid of acid material which compound has the ability to decompose at vulcanizing temperatures to yield an aliphatic amine or ammonia, and vulcanizing the rubber.

3. A process of producing vulcanized rubber which comprises mixing rubber containing sulphur and a metallic oxide with an organic "ultra" or "semi-ultra" accelerator in the presence of a compound having the formula

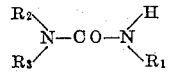

wherein $R_1$ represents hydrogen or an aliphatic hydrocarbon radical, and $R_2$ and $R_3$ represent hydrogen or similar or dissimilar aliphatic or aromatic hydrocarbon radicals, and vulcanizing the rubber.

4. A process of producing vulcanized rubber which comprises mixing rubber containing sulphur and a metallic oxide with an organic "ultra" or "semi-ultra" accelerator in the presence of a compound having the formula

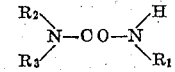

wherein $R_1$ represents hydrogen or an alkyl radical, and $R_2$ and $R_3$ represent hydrogen or similar or dissimilar alkyl, aralkyl or aryl radicals, and vulcanizing the rubber.

5. A process of producing vulcanized rubber which comprises mixing rubber containing sulphur and a metallic oxide with an ultra or semi-ultra accelerator in the presence of a substantially neutral carbamide which has the ability to decompose at vulcanizing temperatures to yield an aliphatic amine or ammonia, and vulcanizing the rubber.

6. A process of producing vulcanized rubber which comprises mixing rubber containing sulphur and a metallic oxide with an organic accelerator in the presence of urea, and vulcanizing the rubber.

7. A process of producing vulcanized rubber which comprises mixing rubber containing sulphur and a metallic oxide with an organic "ultra" or "semi-ultra" accelerator in the presence of urea, and vulcanizing the rubber.

8. A vulcanization accelerator composition comprising an organic accelerator and a substantially neutral nitrogenous organic compound devoid of acid material which compound has the ability to decompose at vulcanizing temperatures to yield an aliphatic amine or ammonia.

9. A vulcanization accelerator composition comprising an organic "ultra" or "semi-ultra" accelerator and a substantially neutral nitrogenous organic compound devoid of acid material which compound has the ability to decompose at vulcanizing temperatures to yield an aliphatic amine or ammonia.

10. A vulcanization accelerator composition comprising an organic accelerator and a substantially neutral carbamide adapted to decompose at vulcanizing temperatures to yield an aliphatic amine or ammonia.

11. A vulcanization accelerator composition comprising an organic accelerator and urea.

12. A process of producing vulcanized rubber which comprises mixing a rubber composition containing sulphur and a metallic oxide with an organic accelerator in the presence of a substantially neutral nitrogenous organic compound devoid of basic organic material which compound has the ability to decompose at vulcanizing temperatures to yield an aliphatic amine or ammonia, and vulcanizing the rubber.

13. A vulcanization accelerator composition comprising an organic "ultra" or "semi-ultra" accelerator and a substantially neutral nitrogenous organic compound devoid of basic organic material which compound has the ability to decompose at vulcanizing temperatures to yield an aliphatic amine or ammonia.

14. A process of producing vulcanized rubber which comprises mixing rubber containing sulphur and a metallic oxide with a thiuram sulfide in the presence of a compound having the formula

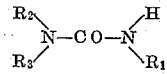

wherein $R_1$ represents hydrogen or an aliphatic hydrocarbon radical, and $R_2$ and $R_3$ represent hydrogen or similar or dissimilar aliphatic or aromatic hydrocarbon radicals, and vulcanizing the rubber.

15. A process of producing vulcanized rubber which comprises mixing rubber containing sulphur and a metallic oxide with tetramethyl thiuram disulfide in the presence of a compound having the formula

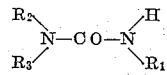

wherein $R_1$ represents hydrogen or an aliphatic hydrocarbon radical, and $R_2$ and $R_3$ represent hydrogen or similar or dissimilar aliphatic or aromatic hydrocarbon radicals, and vulcanizing the rubber.

16. A process of producing vulcanized rubber which comprises incorporating with rubber a vulcanizing agent, a benzothiazyl sulphide vulcanization-accelerator, and a compound having the formula

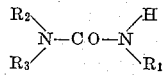

wherein $R_1$ represents hydrogen or an aliphatic hydrocarbon radical, and $R_2$ and $R_3$ represent hydrogen or similar or dissimilar aliphatic or aromatic hydrocarbon radicals, and vulcanizing the rubber.

17. A process of producing vulcanized rubber which comprises incorporating with rubber sulphur, mercaptobenzothiazole, and urea, and vulcanizing the rubber.

18. A vulcanization-accelerator composition comprising a benzothiazyl sulphide vulcanization-accelerator and a compound having the formula

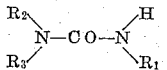

wherein $R_1$ represents hydrogen or an aliphatic hydrocarbon radical, and $R_2$ and $R_3$ represent hydrogen or similar or dissimilar aliphatic or aromatic hydrocarbon radicals.

19. A vulcanization-accelerator composition comprising mercaptobenzothiazole and urea.

20. A process of producing vulcanized rubber which comprises incorporating with rubber a vulcanizing agent, an aldehyde-amine vulcanization-accelerator, and a compound having the formula

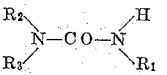

wherein $R_1$ represents hydrogen or an aliphatic hydrocarbon radical, and $R_2$ and $R_3$ represent hydrogen or similar or dissimilar aliphatic or aromatic hydrocarbon radicals, and vulcanizing the rubber.

21. A process of producing vulcanized rubber which comprises incorporating with rubber, sulphur, a butyraldehyde-aniline condensation product and urea, and vulcanizing the rubber.

22. A vulcanization-accelerator composition comprising an aldehyde-amine vulcanization-accelerator and a compound having the formula

wherein $R_1$ represents hydrogen or an aliphatic hydrocarbon radical, and $R_2$ and $R_3$ represent hydrogen or similar or dissimilar aliphatic or aromatic hydrocarbon radicals.

23. A vulcanization-accelerator composition comprising a butyraldehyde-aniline condensation product and urea.

24. A vulcanization-accelerator composition comprising a thiuram sulphide vulcanization-accelerator and a compound having the formula

wherein $R_1$ represents hydrogen or an aliphatic hydrocarbon radical and $R_2$ and $R_3$ represent hydrogen or similar or dissimilar aliphatic or aromatic hydrocarbon radicals.

25. A vulcanization-accelerator composition comprising tetramethyl thiuram disulphide and urea.

26. A process of producing vulcanized rubber which comprises incorporating with rubber, a vulcanizing agent, urea, and an organic accelerator selected from the group consisting of mercaptobenzothiazole, 2,4-dinitrophenyl benzo thiazyl sulphide, benzo thiazyl disulphide, tetramethyl thiuram disulphide, tetramethyl thiuram mono sulphide, 2,4-dinitrophenyl dimethyl dithiocarbamate, heptaldehyde-aniline condensation product, butyraldehyde-aniline condensation product, phenyl methylene bis dimethyl dithiocarbamate, thiocarbanilide, and vulcanizing the rubber.

Signed at New York, county of New York, State of New York, this 11th day of December 1930.

WILLIAM F. TULEY.